United States Patent
Vitt et al.

(10) Patent No.: US 9,201,560 B2
(45) Date of Patent: Dec. 1, 2015

(54) MULTIPLE USER DATA ENTRY SYSTEM AND METHOD

(75) Inventors: Joan L. Vitt, Parsons, KS (US); Tony L. McCowan, Pittsburg, KS (US); Derald E. Caudle, Pittsburg, KS (US)

(73) Assignee: AFIX Technologies, Inc., Pittsburg, KS (US)

( * ) Notice: Subject to any disclaimer, the term of this patent is extended or adjusted under 35 U.S.C. 154(b) by 195 days.

(21) Appl. No.: 13/549,240

(22) Filed: Jul. 13, 2012

(65) Prior Publication Data

US 2013/0019194 A1    Jan. 17, 2013

Related U.S. Application Data

(60) Provisional application No. 61/507,374, filed on Jul. 13, 2011.

(51) Int. Cl.
G06F 3/048 (2013.01)

(52) U.S. Cl.
CPC ....................................... G06F 3/048 (2013.01)

(58) Field of Classification Search
None
See application file for complete search history.

(56) References Cited

U.S. PATENT DOCUMENTS

| | | | |
|---|---|---|---|
| 3,558,864 A | 1/1971 | French | |
| 3,699,519 A | 10/1972 | Campbell | |
| 3,893,080 A | 7/1975 | Ho et al. | |
| 4,015,240 A | 3/1977 | Swonger et al. | |
| 4,156,230 A | 5/1979 | Riganati et al. | |
| 4,210,899 A | 7/1980 | Swonger et al. | |
| 4,310,827 A | 1/1982 | Asai | |
| 4,696,046 A | 9/1987 | Schiller | |
| 4,747,147 A | 5/1988 | Sparrow | |
| 4,790,564 A | 12/1988 | Larcher et al. | |
| 4,817,183 A | 3/1989 | Sparrow | |
| 4,896,363 A | 1/1990 | Taylor et al. | |
| 4,944,021 A | 7/1990 | Hoshino et al. | |
| 4,947,442 A | 8/1990 | Tanaka et al. | |
| 4,947,443 A | 8/1990 | Costello | |

(Continued)

OTHER PUBLICATIONS

"AFIX Products Overview", http://www.afixtechnologies.com/newsite2006/afix-products.html, Nov. 2006.

(Continued)

*Primary Examiner* — Anil N Kumar
(74) *Attorney, Agent, or Firm* — Law Office of Mark Brown, LLC; Mark E. Brown; Christopher M. DeBacker

(57) ABSTRACT

A computer program acts as a data collection, compilation, storage, and display in an autonomous and dynamic fashion. The software may be used by numerous separate and unrelated facilities working as a network on related projects with diverse hardware. A portable storage device is used to store the necessary software. This storage device will be shared between computer systems on site to collect, compile and store information from each facility. Once all sections are complete, it will be handed to a final arbitrator for review. The ultimate goal of a preferred embodiment is a portable system capable of dynamic modification capable of use in many different fields of operation.

2 Claims, 5 Drawing Sheets

(56) References Cited

U.S. PATENT DOCUMENTS

| | | | |
|---|---|---|---|
| 5,040,223 A | 8/1991 | Kamiya et al. | |
| 5,040,224 A | 8/1991 | Hara | |
| 5,067,162 A | 11/1991 | Driscoll, Jr. et al. | |
| 5,105,467 A | 4/1992 | Kim et al. | |
| 5,109,428 A | 4/1992 | Igaki et al. | |
| 5,187,747 A | 2/1993 | Capello et al. | |
| 5,239,590 A | 8/1993 | Yamamoto | |
| 5,420,937 A | 5/1995 | Davis | |
| 7,613,929 B2 | 11/2009 | Cohen et al. | |
| 8,036,431 B1 | 10/2011 | Fisher et al. | |
| 8,676,658 B2* | 3/2014 | Marcus et al. | 705/26.1 |
| 8,880,718 B2 | 11/2014 | Caudle et al. | |
| 2002/0038357 A1* | 3/2002 | Haverstock et al. | 709/218 |
| 2004/0167929 A1 | 8/2004 | Osborne et al. | |
| 2005/0257157 A1* | 11/2005 | Gilboa et al. | 715/747 |
| 2009/0138813 A1* | 5/2009 | LaMontagne | 715/771 |

OTHER PUBLICATIONS

"AFIX VP", http://www.afix.net/newsite2006/afix-vp.html, Nov. 2006.
"Microsoft Office Visio Professional 2007 Getting Started Screen".
Adobe, "Adobe Photoshop CS2 Brochure", (2005).
Aware.Com, "NITSPack SDK brochure", (Aug. 2007).
Federal Bureau of Investigation, "Electronic Fingerprint Transmission Specification (EFTS)".
Jiang, et al., "Fingerprint Minutiae Matching Based on the Local and Golbal Structures".
Mitretek, George K., "How AFIS Selection Was Performed for IAFIS", (Apr. 6, 2006).
Reddy, Saveen "Visio/IronPython/Powershell—How to draw nice diagrams from the command line", http://blogs.msdn.com/b/saveenr/archive/2009/01/22/visio-ironpython-powershell-how-to-draw-nice-diagrams-from-the-command-line.aspx, (Jan. 22, 2009).

* cited by examiner

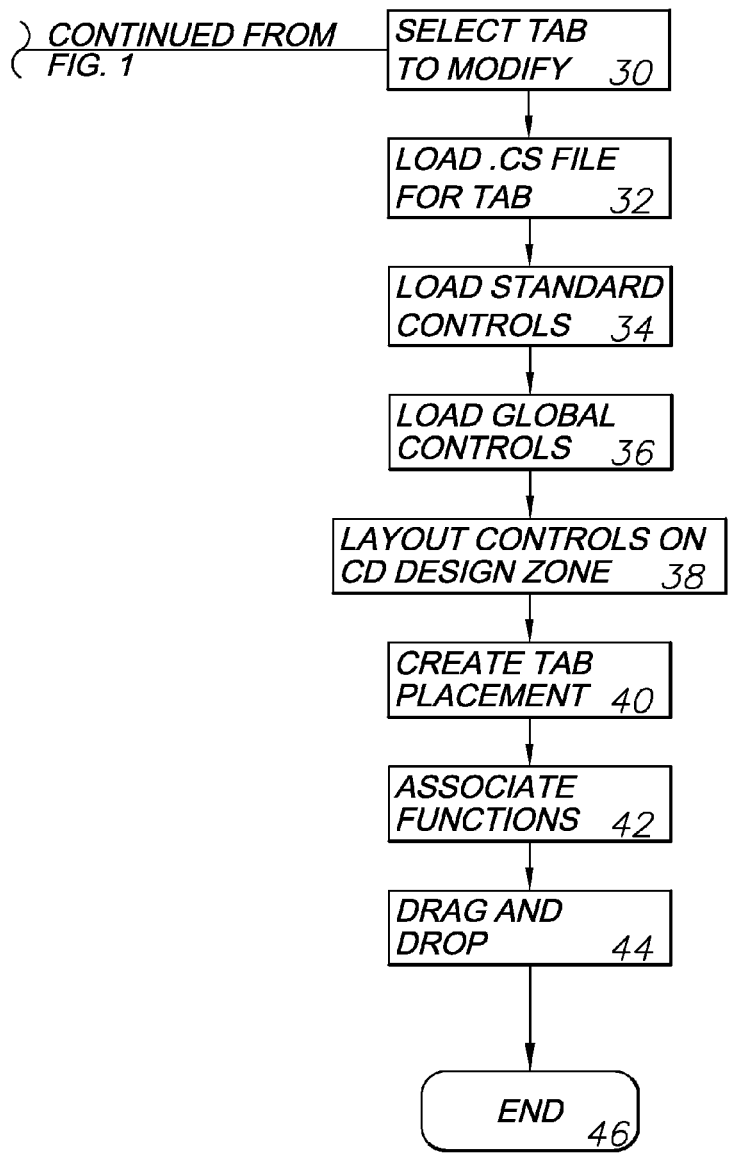
FIG. 1.1

MULTIPLE USER DATA ENTRY SYSTEM AND METHOD

CROSS-REFERENCE TO RELATED APPLICATION

This application claims priority in U.S. Provisional Patent Application Ser. No. 61/507,374, filed Jul. 13, 2011, which is incorporated herein by reference.

BACKGROUND OF THE INVENTION

1. Field of the Invention

The present invention relates generally to a system and method for entering data into customized forms, and more specifically to a system and method which allows multiple users to enter data, with each user having their own customizable and secure form.

2. Description of the Related Art

Data creation, correlation, and storage using an interactive computer system intended for multiple users are well known. However, typical systems are able to utilize networked communication between machines at remote locations. These typical systems are able to secure data to each machine. However, there may be instances when a single machine without network access must be used to gather data at remote locations, such as for use in field research.

Security is always an issue on a shared computing device. It is necessary to ensure that such a system includes adequate security such that each individual is allowed to access and edit only the data that they collect and have clearance to view. Administrators should be allowed separate access.

Systems and methods for creating customizable data entry forms exist, but these typically require some higher level of technical prowess, such as knowledge of computer programming or coding. What is desired is a method of creating data collection forms on a remote computing device which is simple enough for even the least technically minded individual, but which is capable of collecting, storing, and collating vast amounts of useful data for interpretation later.

Heretofore there has not been available a data entry and collection system or method with the advantages and features of the present invention.

SUMMARY OF THE INVENTION

The general purpose of an embodiment of the present invention is to provide software that acts as a data collection, compilation, storage, and display in an autonomous and dynamic fashion. The software may be used by numerous separate and unrelated facilities working as a collection on related projects with diverse hardware. A portable storage device is used to store the necessary software. This storage device will be shared between computer systems on site to collect, compile and store information from each facility. Once all sections are complete, it will be handed to a final arbitrator for review. The ultimate goal of a preferred embodiment is a portable system capable of dynamic modification capable of use in many different fields of operation.

A preferred embodiment includes software comprising two separate elements: (1) a Content Viewer and (2) a Content Designer. It is necessary that all storage and program functionality be present when the present invention is moved from system to system, while requiring minimal hardware support.

The Content Designer element is responsible for the administration and configuration of the Content Viewer such as the addition of new tabs, the layout of tab controls, the modification of questions, tab properties, and control properties, as well as password and general security control. The primary purpose of the Content Designer element is administrative in nature, and is used to design and layout the appearance of new interfaces by dragging and dropping loaded, pre-programmed controls. In short: the Content Designer configures the Content Viewer.

The Content Viewer element is essentially the control panel for a preferred embodiment of the present invention. It is responsible for high-level operations including a user interface and data collation, import, and export functions. It is also the core software element of a preferred embodiment of the present invention. The primary purpose of the Content Viewer is to allow users to display the created information from the Content Designer and to interact with system operators in a close relationship. The Content Viewer gathers data from the user.

A number of considerations must be present to adequately perform a preferred method of the present invention. The core software elements must take into account multiple operating systems. The interactive portions must also account for users with limited technical knowledge.

In a preferred embodiment, the end user environment would be a field location wherein the user is utilizing a mobile computing device such as a laptop computer on battery power. The project should not depend upon immediate communication between the mobile user's system and another computing system, as it is unlikely that the user will have access to network communications, such as via the internet, at the remote field location.

Several different users will have access to the same system as the system moves from one station to the next. However, security must be maintained as users from one station should not have access to information of the other stations. Some users may be granted access to global information. One layer of security should be in place for users, and another separate layer for the administrators.

One primary example of this system would be to generate identification cards for individuals. The system could be set up to request user name, birth date, and address information, as well as a photograph, and may generate an ID card based upon the information produced.

BRIEF DESCRIPTION OF THE DRAWINGS

The drawings constitute a part of this specification and include exemplary embodiments of the present invention and illustrate various objects and features thereof.

FIG. 1.1 is a flowchart for a process of modifying a data tab using a Content Designer element of an embodiment of the present invention.

DETAILED DESCRIPTION OF THE PREFERRED EMBODIMENTS

I. Introduction and Environment

Figure 1:
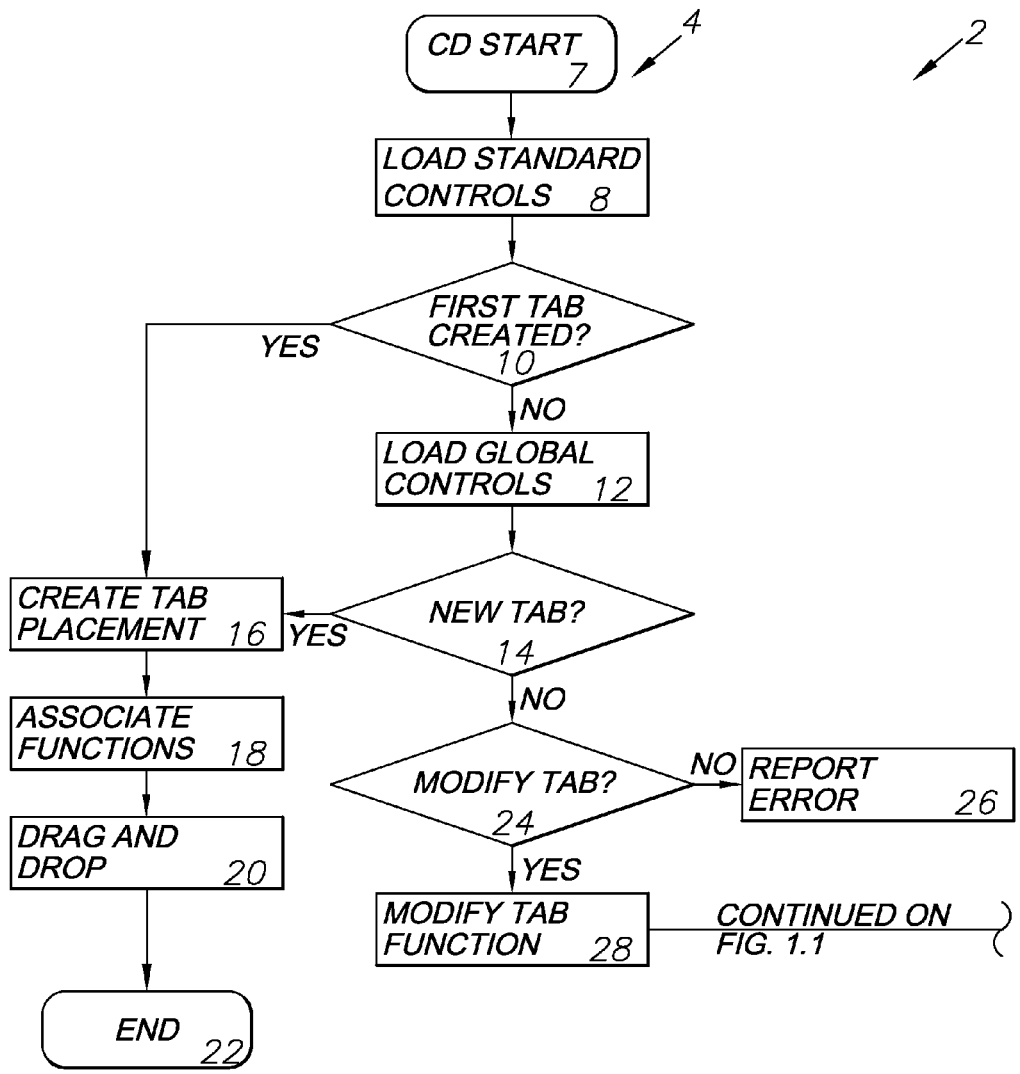
FIG. 1 is a flowchart for a process of creating a new data tab using a Content Designer element of an embodiment of the present invention.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

The following is a list of common acronyms that may be used herein:

| ACRONYM/<br>ABBREVIATION | DEFINITION/DESCRIPTION |
| --- | --- |
| BPAC | Biometric Portable Acquisition Computer |
| CV | Content Viewer |
| CD | Content Designer |
| EFT | Electronic Fingerprint Transmission |
| GUI | Graphical User Interface |
| IDE | Interactive Development Environment |
| MSIL | Microsoft Intermediate Language |
| PC | Personal Computer |
| OS | Operating System |
| XML | Extensible Mark-up Language |

The presented multiple-user data entry system 2 and method of acquiring data is intended to be used by individuals at remote, field locations where network access is not available. The intended users are likely to have limited technical knowledge as to computer programming or coding. Users can use the present system to collect data from multiple users and to collate and process the collected data.

II. Multi-User Data Entry System 2

As shown in the figures, the multi-user data entry system 2 is mainly comprised of a Content Designer 4 element ("CD"), and a Content Viewer 6 element ("CV"). These two elements allow users and administrators to quickly and easily generate tabbed forms which collect and collate data. Each tab can represent a different site or station in the field. As the computing device is transferred amongst the stations, new tabs may be added and new data collected. The underlying system (not diagramed) includes a mobile computing system with a memory storage media, a processor, an input device, and a graphical user interface.

The data system 2 is capable of exporting data from the Content Viewer 6 to a secondary storage device, such as a USB 2.0 storage drive. This storage device can be taken from station to station or computer to computer, and data can continually be added to or modified on the storage device. The Content Viewer application and the Content Designer application may also be stored on the secondary storage device.

II. Content Designer 4

The Content Designer 4 is responsible for the administration and configuration of the entire system 2. It creates what the Content Viewer 6 accesses and utilizes. It is capable of modifying the layout of the interface, as well as changing or updating security settings.

FIG. 1 demonstrates the process of creating a new tab for collecting data using a Content Designer 4 element. The process starts at 7, wherein the Content Designer is started or booted up. After the user logs in and provides the proper passwords, the program will load a set of standard controls at 8. If the first tab has not been created at 10, the global controls are then loaded at 12. The user then has the option of adding a tab at 14. Once a tab is created, or if a first tab is present, the user selects that tab placement at 16. The user will associate specific functions to the tab at 18, and will drag and drop functions to the tab at 20. Once all tabs have been created, the process ends at 22. The user may generate new tabs at any time. More information of this process is available in FIG. 3 and below.

If the user does not wish to generate a new tab at 14, the user will be presented with the option to modify existing tabs at 24. Only those tabs to which the user specifically has access to will be available for editing. Access is determined by an administrator who provides parameters prior to use of the program by the end users. Highly encrypted passwords may be used to ensure security of data. If the user selects to modify existing tabs at 24, the user will then select the "modify tab" function at 28, or alternatively that function may automatically begin at the user's selection.

As shown in FIG. 1.1, the user must select which tab(s) to modify at 30. The system automatically loads a .CS file or similar file which contains all of the stored data for the selected tab at 32. This includes the tab's layout, all commands associated with the tab, and all data requests the tab may require.

The system then loads the standard controls at 34, the global controls at 36, and the layout controls within the control designer "design zone" at 38. The user will then modify the tab by creating tab and control placement at 40, associate functions to controls within the tab at 42, and drag and drop new elements at 44. The process ends at 46 when the user selects to "save" or "cancel" the operation.

Figure 3:
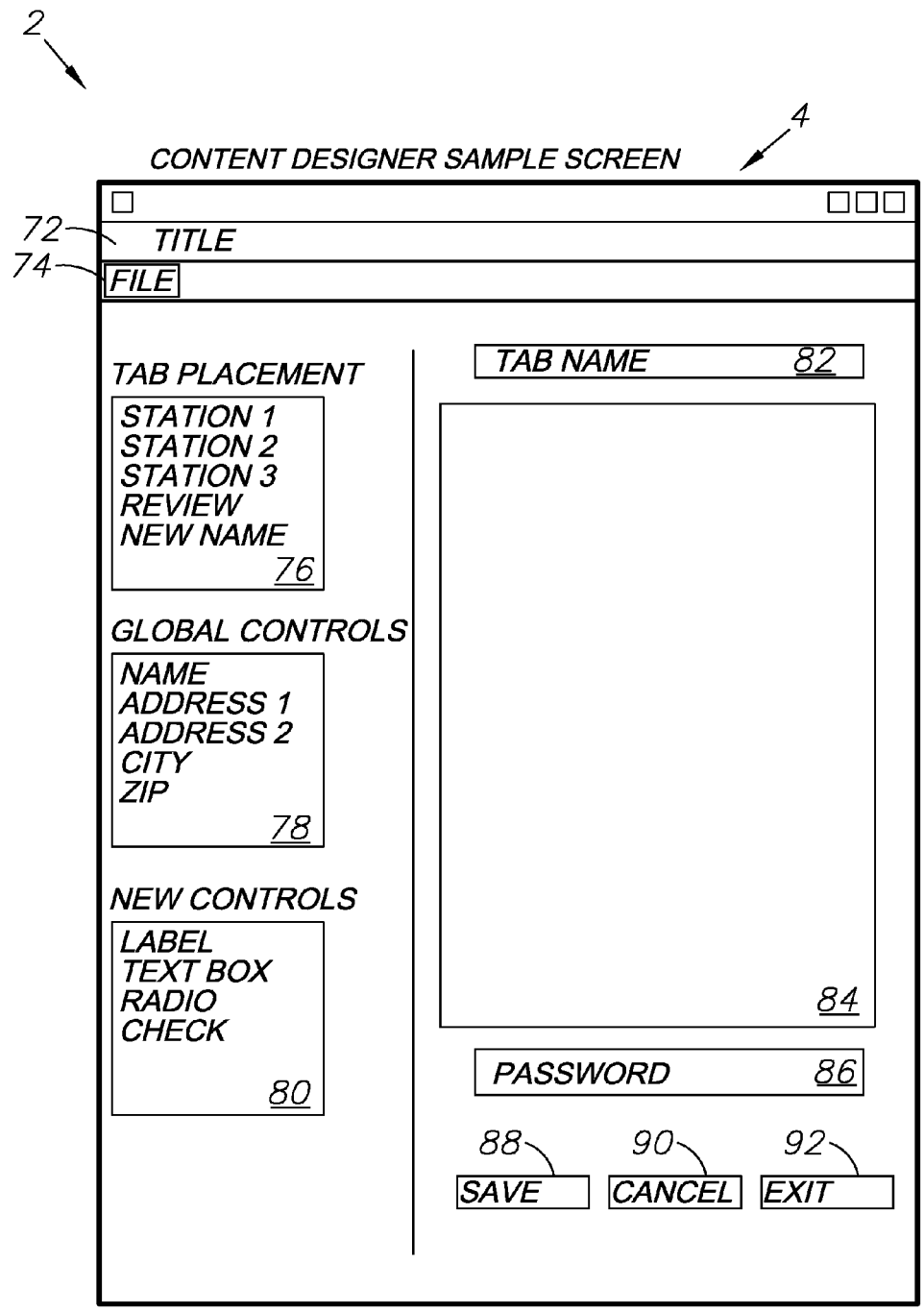
FIG. 3 is an example of a graphical user interface showing a Content Designer element of an embodiment of the present invention.

FIG. 3 is a visual layout of an example of the Content Designer 4 as it would appear on the graphical user interface, such as on a computer screen. The display may have a title 72, such as the title of the project or a summary of the data being collected. Menu options, such as a "file" option 74, may be listed across the top of the display. These menu options allow the user to save, open, exit, and otherwise modify the data file on the computing device's storage media.

Control choices are listed in the display window, which correspond with the "standard controls" and "global controls" mentioned previously. They are stored in a virtual "toolbox" which can be updated or modified at any time. Tab placement controls can be selected from the tab placement selection box 76. These controls allow the user to select which tab is being edited and where data fields will go. A global controls selection box 78 includes other data fields which may be added to the tab. New controls may be created by the user or the administrator for each specific data collection job. These tools will be located in the new controls selection box 80, and can include such control elements as radio buttons, check boxes, combination boxes, list boxes, numeric lists, or any similar input control.

The user may drag and drop the controls from the selection boxes 76, 78, 80 directly onto the free-form tab creation workspace 84. This window can be reorganized by the user by simply dragging and rearranging the different controls. The tab name entry box 82 can be updated with a new title specific to the data being collected by the specific tab. A password may be entered into the password entry box 86. This secures the tab and prevents unauthorized access to modify the tab or to access data collected by that tab. Finally, option buttons such as a save button 88, a cancel button 90, and an exit button 92 are located on the display window. The save button saves the tab to a .cs file or other file type to be used by the Content Viewer 6 or to be modified by the Content Designer 4. The cancel button 90 cancels the changes or additions to the tab. The exit button 92 exits the Content Designer program.

III. Content Viewer 6

The Content Viewer 6 is the control panel through which the user accesses the organizational or departmental pages established by the Content Designer 4. It is responsible for high-level operations such as the user interface, data collection functions, collation, import and export of data, and Identification card generation in an example of an embodiment of the present invention. The only administrative function allowed for the Content Viewer 6 is the ability to change the password for the individual tabs or views that the user has clearance or access to. Other password and administrative changes must be accessed through the Content Designer 4.

Figure 2:
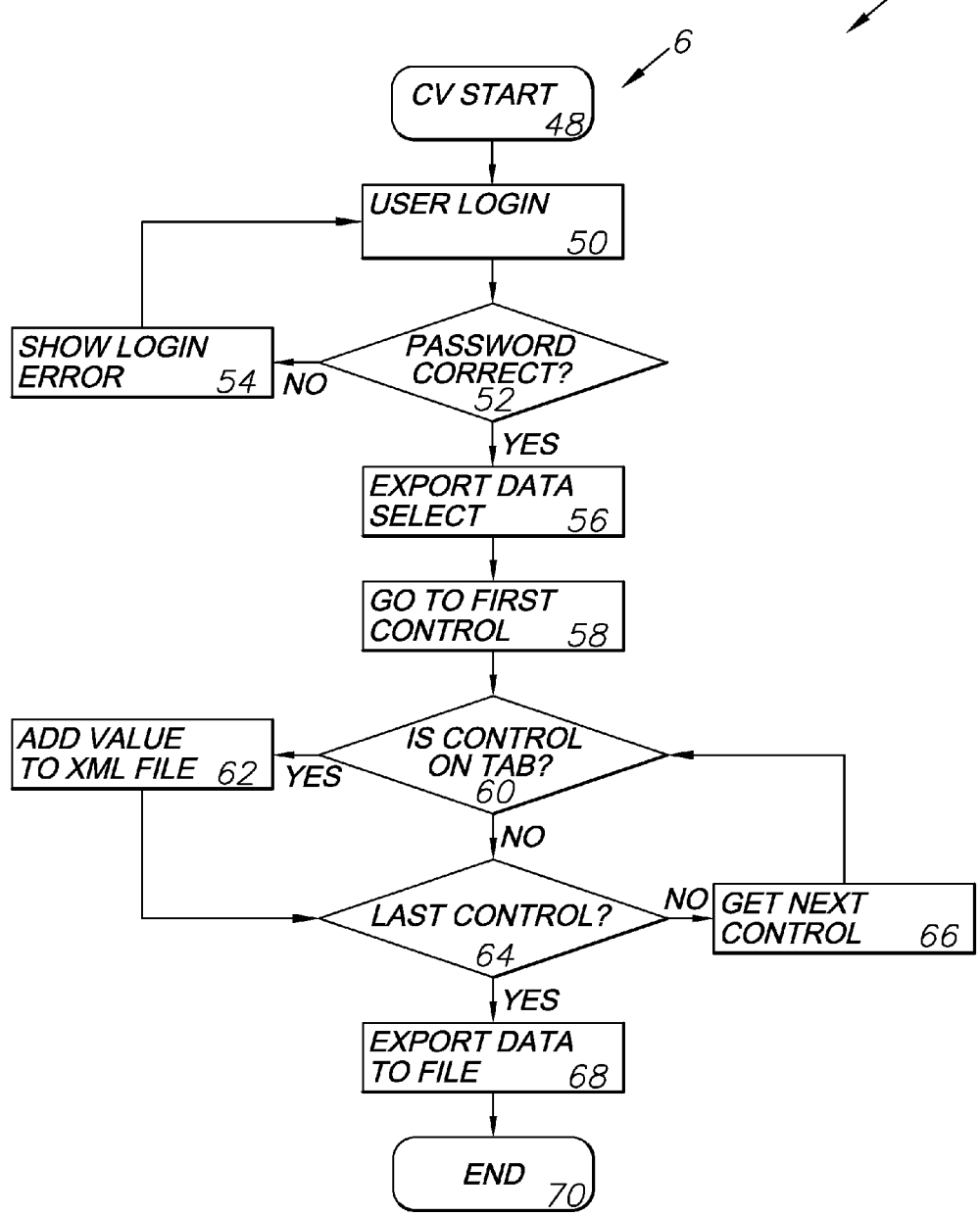
FIG. 2 is a flowchart for a process of accessing and viewing a series of data tabs using a Content Viewer element of an embodiment of the present invention.

FIG. 2 demonstrates a method of viewing data and tabs created by the Content Designer 4 with the Content Viewer 6. The program is started at 48, and the user is prompted to login at 50. The user enters a password and it is checked at 52. If the password is incorrect, the user is shown an error at 54, and is again prompted to login. There may be a default number of attempts allowed to enter a password before the system locks the user out entirely, thereby requiring administrator action to unlock the program.

If the user inputs the correct password, the tabs that the user has access to will be displayed. If the user attempts to access additional tabs, the user will be prompted with additional password requests.

The user will select to export data at 56. This exports data collected to a database secured on the computing device and opens a clean tab where all data fields are empty and all controls are deselected. The user will go to the first control at 58. The system checks to see if that control is available on the tab at 60. If it is, the value input into that control point is added to the .xml file at 62. This .xml file stores all user input data for later use.

If the control is not available on the tab, the system checks to determine if the last control input has been received at 64. This means that the system will check to determine if there are any available, open controls remaining on the tab. If there are, the user must then proceed to the next control field at 66. If the control is available on the tab, the data is again stored to the .xml file at 62. This process repeats until the last control is completed at 64. Data collected is then exported to a final data file at 68, and the process ends at 70.

Figure 4:
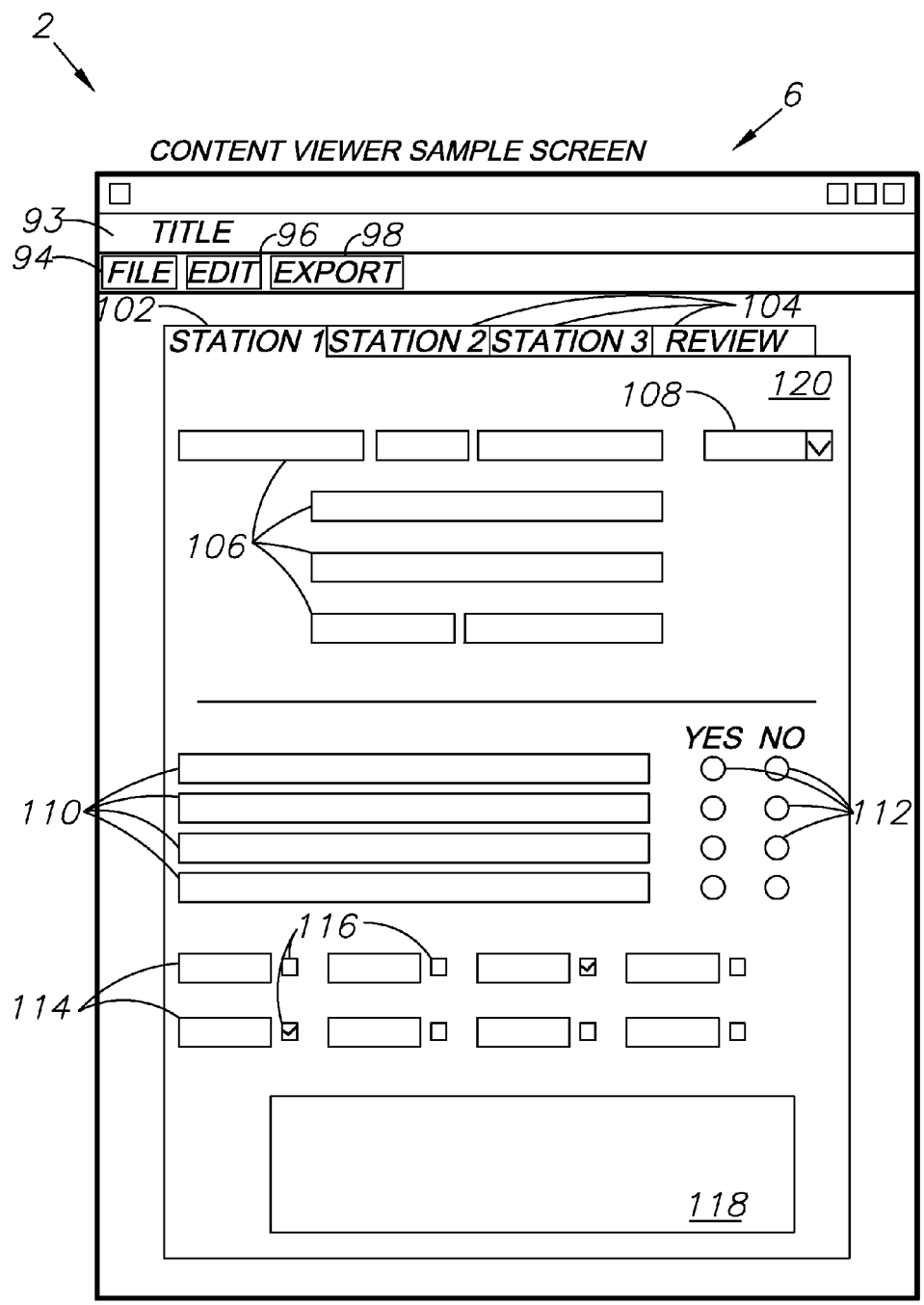
FIG. 4 is an example of a graphical user interface showing a Content Viewer element of an embodiment of the present invention.

FIG. 4 is a visual layout of an example of the Content Viewer 6 as it would appear on the graphical user interface, such as on a computer screen. Similar to the Content Designer 4 display, the Content Viewer display includes a title block 93 specific to the particular project. A number of menu options such as file 94, edit 96, and export 98 are available. There will likely be more options available for the Content Viewer 6. The edit menu 96 allows the user to edit text input, copy and paste information, and perform other tasks within the Content Viewer's constraints. The export menu 98 allows the user to export data collected by the Content Viewer 6 to a desired location on the computing device's storage media.

A number of station tabs are prominently displayed on the main display screen of the Content Viewer 6. There will be one active tab 102 and a number of idle tabs 104. If the user has appropriate access to additional tabs, the user simply clicks on those tabs using an input device, such as a computer mouse, to access them. The chosen tab will then become the active tab, and the previously active tab will become idle.

The active tab 102 content area 120 includes a number of control inputs which may be filled by the user. These control inputs were created using the Content Designer 4 via the "drag and drop" method mentioned previously. A number of text input fields 106 may be displayed here. These fields collect specific data from the user, such as the user's name, age, address, and other desired data. Drop down menus 108 may also be used to expedite this data collection process by allowing the user to choose pre-selected inputs.

A number of data collection questions may appear in inquiry text fields 110, and radio buttons 112 may be placed next to these fields to allow the user to answer those questions. Any number of radio buttons may accompany each inquiry field 110, and multiple radio buttons may be selected per question depending on the data being collected. Additional inquiry fields 114 may be accompanied by check boxes 116. Data will be collected depending on whether these boxes are checked or left unchecked. Finally, a freeform text box 118 may be provided to collect comments, reviews, or additional information.

Other possible fields (not shown) may include photographs, such as mugshots or passport photos, fingerprints, and other identifying information. Fields could also include data voluntarily offered by an individual, such as blood type, profession, or education level. The ranges of the data collected ranges and security levels may depend upon what data is being collected. If biographical data, fingerprint data, or other data is input, it may be exported into an .xml or .eft file for use in an external database search, such as an Automated Fingerprint Identification System (AFIS).

One of the tabs may include a "reviewer" or "arbitrator" tab. This tab can be used to rate the other tabs, and generally will require unique security clearance to access. This tab may further include functions which can analyze data collected using the other tabs.

As shown in the example window, each tab may represent a different field station. Each station may be collecting different data. Users at one station generally will not have access to information gathered at other stations. As the computing device is transferred between stations, data is stored in a secured manner on the computing device's storage memory.

An example process that may be used with the present invention is a method of generating identification cards. Once the Content Designer 4 has setup set up a proper questionnaire among one or many tabs, the user can gather information from an individual and input that data into the required fields. This would include the name, date of birth, address, and other vital information for the individual. The system could check to determine if all data fields have been properly filled in, and then allow the user to generate an ID card for the individual automatically. Data will be securely saved and only authorized persons would have access to the individual's data.

A further example of this could even include photographs of an individual's eyes, photographs of the individual's face, fingerprints of the individual, and even photographs of scars or tattoos on the individual's body. Such a system could be used for criminal processing or for generating identification cards which require more information. It is important that all of this data be securely saved, as it is highly private data. Passwords must be very secure, and only administrators should have absolute access to all of the individual data.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of image-matching processes when viable.

Having thus described the disclosed subject matter, what is claimed as new and desired to be secured by Letters Patent is:

1. A multi-user data entry system comprising:
   a first computing device including a storage memory, a graphical user interface (GUI), a processor, and an input device;
   a second computing device including a storage memory, a graphical user interface (GUI), a processor, and an input device;
   a content design application including a display interface viewable by said GUI and modifiable by said input device, a plurality of control inputs and a plurality of modifiable input fields, said content design application being stored onto said storage memory of said first computing device;
   a Content Viewer application including a display interface viewable by said GUI and modifiable by said input device, a plurality of control inputs and a plurality of modifiable input fields, said content viewer application being stored onto said storage memory of said second computing device;
   a secondary memory storage device capable of storing data exported by said Content Viewer application and said content design application, wherein said secondary memory storage device may be accessed using said first computing device or said second computing device;
   wherein said content design application is capable of creating a plurality of modifiable data tabs containing a plurality of data inputs, and a reviewer tab, wherein access to each of said modifiable data input tabs requires a separate password to access data contained within said modifiable tabs and said reviewer tab requires a separate password to access;
   wherein said content design application is capable of modifying data located within said modifiable tabs by dragging said control inputs from a list of generated control inputs to a freeform workspace;
   wherein said Content Viewer application is capable of inputting data into said data inputs and exporting said data to said secondary storage memory; said content design application being further capable of adding a plurality of text boxes, drop-down menus, radio buttons, and check boxes to said modifiable tabs;
   said Content Viewer application being further capable of allowing data to be input to said text boxes, drop-down menus, radio buttons, and check boxes;
   said design application being further capable of adding a plurality of image boxes to said modifiable tabs;
   said content viewer application being further capable of importing photographs to said image boxes;
   said second computing device configured to collect data from a location remote from said first computing device;
   said second computing device further configured to be transferred amongst multiple users including a final reviewer;
   said reviewer tab configured to receive ratings inputs associated with said data input tabs, to analyze data contained within said data inputs, to export data from said second computing device, and to clear said data input tabs;
   wherein said reviewer tab is accessible only by said final reviewer;
   wherein said photographs comprise evidence from said location; and
   wherein said photographs are selected from the list comprising: fingerprints, tattoos, scars, eyes, and mugshots.

2. A method of collecting data from multiple users, the method comprising the step:
   providing a first computing device including a storage memory, a graphical user interface (GUI), a processor, and an input device;
   providing a second computing device including a storage memory, a graphical user interface (GUI), a processor, and an input device;
   providing a content design application including a display interface viewable by said GUI and modifiable by said input device, a plurality of control inputs and a plurality of modifiable input fields, said content design application being stored onto said storage memory of said first computing device;
   providing a Content Viewer application including a display interface viewable by said GUI and modifiable by said input device, a plurality of control inputs and a plurality of modifiable input fields, said content design application being stored onto said storage memory of said second computing device;
   creating a plurality of modifiable data input tabs with said content design application, each said tab including a selected subset of said plurality of control inputs and plurality of modifiable input fields;
   adding a plurality of text boxes to said modifiable tabs using said content design application;
   adding a plurality of drop-down menus to said modifiable tabs with said content design application;
   adding a plurality of radio buttons to said modifiable tabs using said content design application;
   adding a plurality of check boxes to said modifiable tabs using said content design application;
   adding a plurality of image boxes to said modifiable tabs using said content design application;
   creating one reviewer tab with said content design application;
   modifying data located within said modifiable tabs using said content design application by dragging said control inputs from a list of said control inputs to a freeform workspace;
   accessing said modifiable tabs with said Content Viewer application and inputting data into said control inputs using said input device;
   inputting data into said text boxes using said Content Viewer application;
   selecting an input from said drop-down menus using said Content Viewer application;
   activating and deactivating said radio buttons using said Content Viewer application;
   activating and deactivating said check boxes using said Content Viewer application;
   importing photographs to said image boxes using said Content Viewer application;
   selecting said photographs from the list comprising: fingerprints, tattoos, scars, eyes, and mugshots;
   exporting said data from said Content Viewer application to a data file stored onto said computing device storage memory;
   providing a unique password required to access each of said modifiable tabs with said content design application and Content Viewer application;
   passing said second computing device amongst a plurality of users;

inputting data into said data input tabs, where at least a portion of said data is collected from a location remote from said first computing device;
accessing said reviewer tab with a reviewer password;
rating said data input tabs with said reviewer tab;
analyzing data from said data input tabs with said reviewer tab;
exporting data from said second computing device with said reviewer tab; and
clearing said data input tabs with said reviewer tab.

* * * * *